Figure 1:
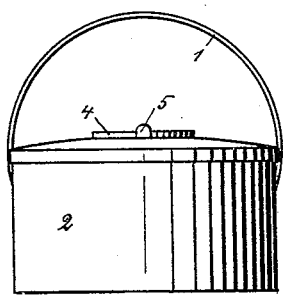

(No Model.)

L. W. SNELL.
CAKE CUTTER.

No. 477,278. Patented June 21, 1892.

WITNESSES.
Rich. A. George.
Herman Booth.

INVENTOR.
Levi W. Snell
By Kirby Robinson
Attys

UNITED STATES PATENT OFFICE.

LEVI W. SNELL, OF UTICA, NEW YORK, ASSIGNOR OF ONE-HALF TO F. WILLIAM FIX, JR., OF SAME PLACE.

CAKE-CUTTER.

SPECIFICATION forming part of Letters Patent No. 477,278, dated June 21, 1892.

Application filed March 24, 1892. Serial No. 426,202. (No model.)

*To all whom it may concern:*

Be it known that I, LEVI W. SNELL, of Utica, in the county of Oneida and State of New York, have invented certain new and useful Improvements in Cake-Cutters; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to an improvement in cake-cutters.

It is the object of my invention to provide a cake-cutter that will eject the cake from the cutter when cut and having a cutter that is capable of cutting a piece from the center of the cake, the central cutter being removable, adapting the cutter for use as a cutter not cutting out the center of the cake.

In the drawings similar numerals of reference refer to corresponding parts in the several figures.

Figure 2:
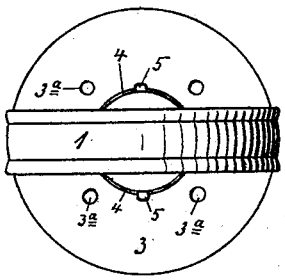
Figure 3:
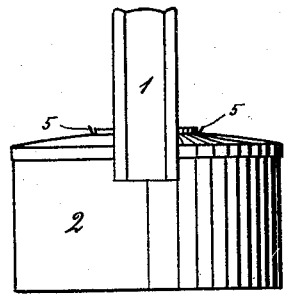
Figure 4:
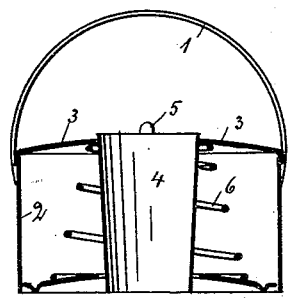
Figure 5:
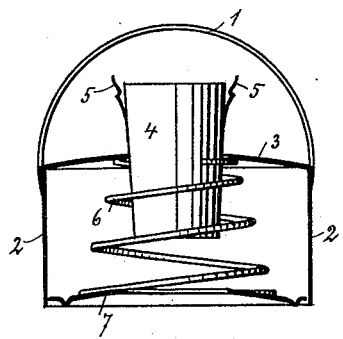
Figure 6:
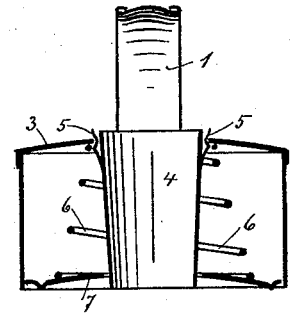
Figures 8, 9:
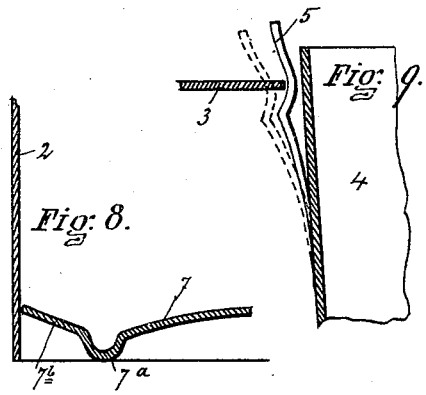
Figure 7:
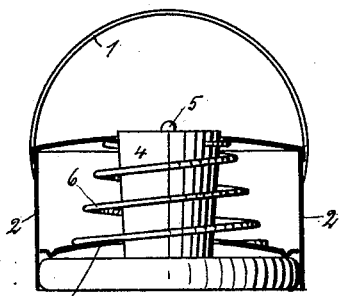

Figure 1 shows in side elevation my improved cake-cutter. Fig. 2 shows a top or plan view of the same. Fig. 3 shows the cutter in side elevation from a different point of view than that in which it is shown in Fig. 1. Fig. 4 shows a vertical section of a cutter including the central cutter. Fig. 5 shows a vertical section of a cutter having the removable central cutter partially removed. Fig. 6 shows a vertical section including the central cutter with the central cutter in position for use. Fig. 7 shows a vertical central section of the cutter, the removable central cutter and spring being shown in full lines containing a cake of dough as cut. Fig. 8 is an enlarged detail in section of the outer cutter-rim and a portion of the follower. Fig. 9 is an enlarged detail view showing one of the springs for securing the central cutter.

Referring more particularly to the reference-numerals marked on the drawings in a more specific description of the device, 1 incates the handle of the cutter spanning the top of the cutter and attached to a cylindrical cutting-rim 2. The rim 2 may be made in a true circle, or irregular or "crimped," as desired. In the upper end of the cylindrical rim 2 is provided a head 3, provided with air-holes 3ª and a central opening for receiving the removable central cutter 4, which is slightly conical with its larger end upward. The central cutter 4 is provided with spring-catches 5 5, secured to the sides of the cutter and adapted to engage the head 3 within the central opening for the reception of the central cutter and secure the central cutter. The upper end of the catch-spring 5 form handles for operating the same. Secured to the inside of the head 3 at one side of the central opening therein is a spring 6, which makes several convolutions toward the bottom of the rim 2, and has attached to its other end a follower 7, which has a central opening for the central cutter. The follower is concave on its under face, and is provided with a rounded rib 7ª near its edge and an upwardly-inclined rim or edge 7ᵇ directly outside of the rib 7ª.

The operation of the device is so simple and well understood that extensive description is unwarranted.

When the cutter is struck into a sheet of dough, the follower is forced upward against the tension of the spring and the dough is cut by rim 2. The central cutter 4 also cuts out the center, which passes into and through the inner cutter as several cuts are made. The rim 7ᵇ and rounded rib 7ª only come in contact with the dough. As the cutter is raised the cake of dough between the rim 2 and central cutter is expelled. By grasping the ends of catches 5 and bringing them toward each other as far as may be the central cutter is released and may be removed either for the purpose of cleaning or to enable the cutter to be used without the central cutter.

What I claim as new, and desire to secure by Letters Patent, is—

1. The combination, in a cake-cutter, of an outer cutting-rim, a removable central cutter, a concave follower having a central opening for said central cutter, and a spring for actuating the follower, substantially as set forth.

2. The combination, in a cake-cutter, of an outer cutting-rim, a central cutter, a concave follower having a central opening for the central cutter and a circumferential rib and upwardly-inclined rim, and a spring for actuating the follower, substantially as set forth.

3. The combination, in a cake-cutter, of an outer cutting-rim, a removable central cutter, a catch for securing the central cutter to the head of the cake-cutter, a washer-shaped concave follower having a circumferential rib and upwardly-inclined rim and adapted to work in the space between the outer cutting-rim and the central cutter, and a spring for actuating the follower, substantially as set forth.

In witness whereof I have affixed my signature in presence of two witnesses.

LEVI W. SNELL.

Witnesses:
ALFRED B. CHARLES,
RICH. A. GEORGE.